United States Patent
Farmer

(10) Patent No.: US 7,527,600 B2
(45) Date of Patent: *May 5, 2009

(54) LIGHT FIXTURE ACCESSORY CONNECTOR AND MOUNTING BRACKET

(75) Inventor: Edmund Farmer, Williston, VT (US)

(73) Assignee: Verilux, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/366,753

(22) Filed: Mar. 2, 2006

(65) Prior Publication Data

US 2006/0193141 A1 Aug. 31, 2006

Related U.S. Application Data

(63) Continuation-in-part of application No. 10/867,148, filed on Jun. 14, 2004, now Pat. No. 7,060,040.

(51) Int. Cl.
*A61B 5/00* (2006.01)

(52) U.S. Cl. ........................ 600/573; 362/257; 362/382; 403/93

(58) Field of Classification Search ........................ None
See application file for complete search history.

(56) References Cited

U.S. PATENT DOCUMENTS

| | | | | |
|---|---|---|---|---|
| 1,375,888 | A * | 4/1921 | Baer ............................ | 403/55 |
| D99,414 | S | 4/1936 | O'Neill | |
| 3,388,249 | A * | 6/1968 | Seigel et al. ................. | 362/269 |
| 3,503,580 | A | 3/1970 | Levy | |
| 4,228,489 | A * | 10/1980 | Martin ......................... | 362/250 |
| 4,547,092 | A * | 10/1985 | Vetter et al. .................... | 403/59 |
| 4,569,498 | A | 2/1986 | Ermanski | |
| 4,702,448 | A | 10/1987 | LoJacono et al. | |
| 4,832,294 | A * | 5/1989 | Eidem ...................... | 248/125.8 |
| 4,832,299 | A * | 5/1989 | Gorton et al. ........... | 248/231.71 |
| 4,836,403 | A | 6/1989 | Blackman | |
| 4,844,397 | A * | 7/1989 | Skakoon et al. ......... | 248/231.71 |
| 4,919,380 | A | 4/1990 | Ely, Jr. | |
| 5,035,389 | A * | 7/1991 | Wang ..................... | 248/224.51 |
| 5,114,023 | A | 5/1992 | Lavin | |
| 5,236,160 | A * | 8/1993 | Sechelski .................. | 248/125.1 |
| D348,113 | S * | 6/1994 | Swanson ...................... | D26/63 |
| 5,322,253 | A * | 6/1994 | Stevens .................. | 248/229.15 |
| 5,829,723 | A * | 11/1998 | Brunner et al. ......... | 248/222.13 |
| 5,836,559 | A * | 11/1998 | Ronci ....................... | 248/230.3 |
| 5,884,888 | A | 3/1999 | Grimes, III et al. | |
| 6,244,558 | B1 * | 6/2001 | Castle ......................... | 248/544 |
| 6,338,212 | B1 | 1/2002 | Santa Cruz et al. | |
| D460,651 | S | 7/2002 | Jobe et al. | |
| 6,457,683 | B1 | 10/2002 | Armstrong, Sr. | |
| 6,481,679 | B1 * | 11/2002 | Bennett et al. .......... | 248/224.51 |
| 6,540,736 | B2 | 4/2003 | Harper et al. | |
| D476,509 | S * | 7/2003 | Orsino et al. .................. | D6/477 |
| 6,619,599 | B2 * | 9/2003 | Elliott et al. .............. | 248/125.8 |
| 7,060,040 | B2 * | 6/2006 | Farmer ........................ | 600/573 |
| 2003/0227770 | A1 | 12/2003 | Chen et al. | |
| 2004/0012344 | A1 | 1/2004 | Bibi | |

* cited by examiner

*Primary Examiner*—Thor S Campbell
(74) *Attorney, Agent, or Firm*—St. Onge Steward Johnston & Reens LLC

(57) ABSTRACT

A light fixture assembly with a mounting element for attaching a light fixture accessory to a stem of the light fixture assembly, the light fixture accessory detachably connectable to the mounting element, the light fixture assembly also having an interface for attaching various light fixture accessories to the bracket.

24 Claims, 17 Drawing Sheets

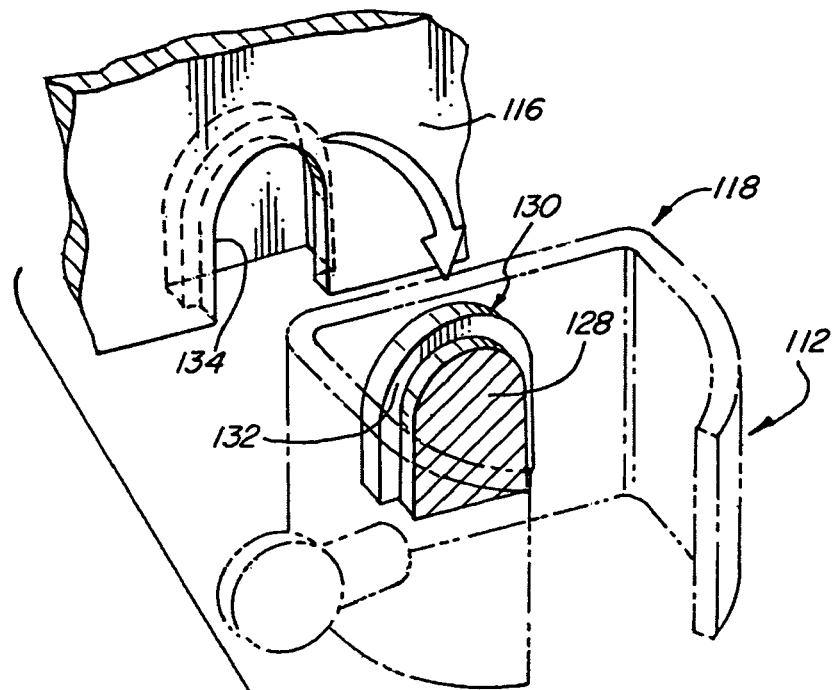
FIG. 4A
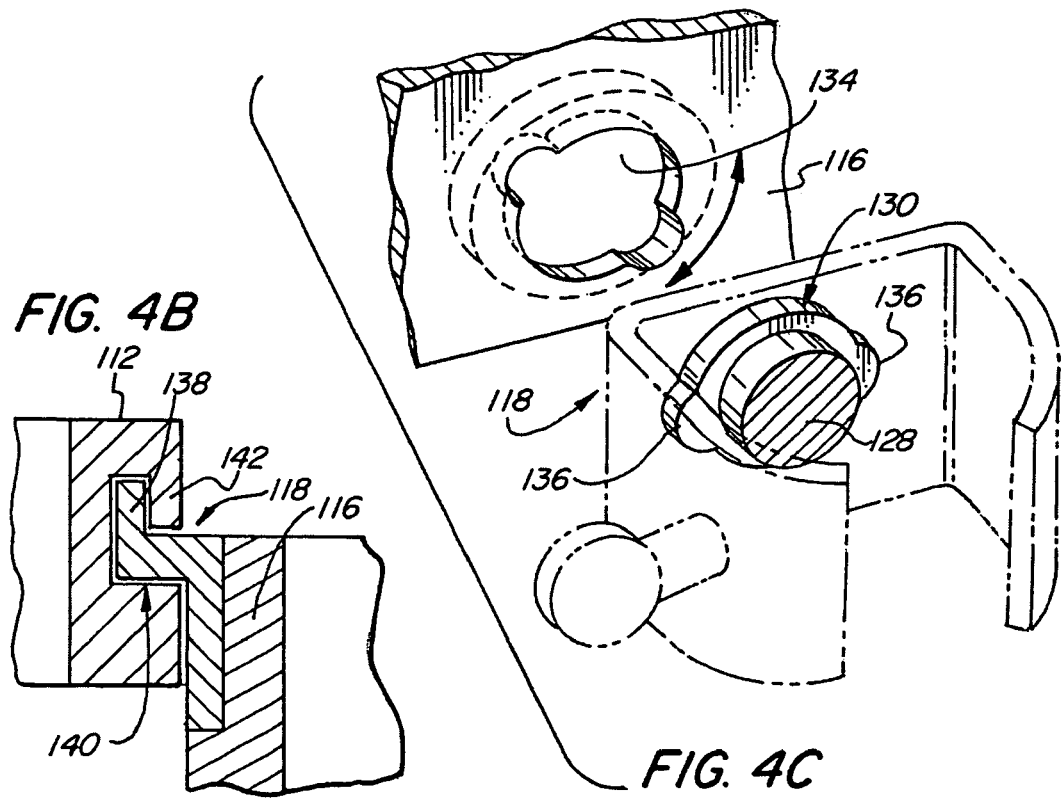
FIG. 4B
FIG. 4C

LIGHT FIXTURE ACCESSORY CONNECTOR AND MOUNTING BRACKET

PRIORITY DOCUMENTS

This application is a continuation-in-part of application Ser. No. 10/867,148, filed Jun. 14, 2004, now U.S. Pat. No. 7,060,040 issued Jun. 13, 2006.

FIELD OF THE INVENTION

The invention relates to a light fixture with a mounting accessory, and more specifically to a light fixture with a detachably connectable accessory that may be fully adjustable to a desired height relative to the light fixture.

BACKGROUND OF THE INVENTION

Free standing lamps have been utilized in various applications for many years. For instance, desk lamps have be utilized to provide directional lighting for work surfaces, while floor lamps have provided both direct and indirect area lighting. Both desk lamps and floor lamps are increasingly desirable for work spaces as opposed to fixed lighting in for instance the ceiling, especially with the widespread use of computers and high energy costs through out the nation.

Work space however, has become increasingly limited and expensive. Individuals have attempted to pack as much into a small work space as reasonably possible with unsatisfactory results. For instance, cluttered work spaces leads to lower productively along with lost or missing items and/or work.

It is also important to maintain a clean and dignified look and feel to an office, especially if an individual is doing business with the public. A messy and cluttered workspace can leave a negative impression on a potential client. With the widespread use of computers and computer peripherals, large quantities of tangled cords hanging off of workspaces (i.e. desks) and running along the floor have become the norm in many offices. This too adds to the overall clutter in the workspace.

Various approaches have been taken to increase working surface areas. For instance, U.S. Pat. No. 4,836,403 to Blackman teaches use of a multi-use tray that is attachable to a table leg or to a vehicle window sill. While this multi-use tray may provide additional surface area in a car or for instance, for a kitchen table, this device is not adaptable for use in an office environment to increase surface area on and around for instance, an individual's desk.

In addition, various trays have been utilized in the medical industry such as U.S. Pat. No. 6,457,683 to Armstrong, Sr. and U.S. Pat. No. 5,114,023 to Lavin, both of which disclose an adjustable tray for holding various medical equipment. Again however, neither of these devices are adaptable for use in for instance, an office environment to increase working surface area on and around for instance, an individual's desk.

Still further, U.S. Design Pat. No. 476,509 to Orsino et al. ("the '509 patent") discloses a lighted computer pole having shelves. This computer pole however, is adapted for use in a computer room rather than in an office. For instance, attachment means are provided to attach the top portion of the computer pole to the ceiling and the bottom portion to the floor. This device is not practical for use on for instance, an individual's desk. Still further, the '509 patent does not teach that the shelves are detachably removable or adjustable.

SUMMARY OF THE INVENTION

What is desired then is a light fixture assembly that will facilitate a cleaner and neater workspace.

It is further desired to provide a light fixture assembly that will provide for an increase in the surface area of a workspace.

It is further desired to provide a light fixture assembly that will facilitate the connection of computer peripherals and limit the clutter associated with large quantities of cords.

It is still further desired to provide a light fixture assembly that will increase the surface area of a workspace with an adjustable height accessory feature.

It is yet further desired to provide a light fixture assembly that incorporates wiring therein for the electrical connection of various computer peripherals.

In one advantageous embodiment a light fixture for housing a lamp is provided comprising a head for holding the lamp, a base, and a stem connecting the head and the base. The light fixture further comprises a bracket releasably connectable to the stem such that the bracket is movable to substantially any position along a length of the stem, at least one light fixture accessory detachably connectable to the bracket, and an interface for detachably connecting the light fixture accessory to the bracket. The light fixture is still further provided such that the at least one light fixture accessory is movable to substantially any position along the length of the stem.

In another advantageous embodiment a light fixture for housing a lamp is provided comprising a head for holding the lamp, a base, and a stem connecting the head and the base. The light fixture further comprises a bracket releasably connectable to the stem such that the bracket is movable to substantially any position along a length of the stem, and at least one light fixture accessory detachably connectable to the bracket. The light fixture still further comprises an interface for detachably connecting the light fixture accessory to the bracket. The light fixture is yet further provided such that the interface engages the bracket to the at least one light fixture accessory to securely hold the bracket at a selected position along a length of the stem.

In still another advantageous embodiment a light fixture for housing a lamp is provided comprising a head for holding the lamp, a base, and a stem connecting the head and the base. The light fixture further comprises a mounting element connectable to said stem such that said mounting element may be positioned at substantially any position along a length of said stem, and at least one light fixture accessory detachably connectable to the mounting element. The light fixture is still further provided such that the at least one light fixture accessory is movable to substantially any position along the length of the stem.

In yet another advantageous embodiment a light fixture for housing a lamp is provided comprising a head for holding the lamp, a base, and a stem connecting the head and the base. The light fixture further comprises a mounting element connectable to the stem such that the mounting element may be positioned at a selected position along a length of the stem, and at least one light fixture accessory detachably connectable to the mounting element.

In still another advantageous embodiment a light fixture for housing a lamp is provided comprising a head for holding the lamp, a base, and a stem connecting the head and the base. The light fixture further comprises a bracket coupled to the stem, the bracket having at least one recess provided therein, and at least one light fixture accessory detachably connectable to the bracket. The light fixture is provided such that the at least one light fixture accessory has a protrusion located thereon for engaging with the recess, and the at least one light fixture accessory is affixed to the stem when the protrusion is inserted into the recess.

In yet another advantageous embodiment a light fixture for housing a lamp is provided comprising a head for holding the lamp, a base, and a stem connecting the head and the base. The light fixture further comprises a mounting element coupled to the stem, and at least one light fixture accessory detachably connectable to the mounting element such that the at least one light fixture accessory may be coupled to the stem.

The invention and its particular features and advantages will become more apparent form the following detailed description considered with reference to the accompanying drawings.

BRIEF DESCRIPTION OF THE DRAWINGS

FIG. 4A is a perspective view of the bracket according to FIG. 3A.

FIG. 4B is a perspective view of the bracket according to FIG. 3B.

FIG. 4C is a perspective view of the bracket according to FIG. 3C.

DETAILED DESCRIPTION OF THE DRAWINGS

Figure 1:
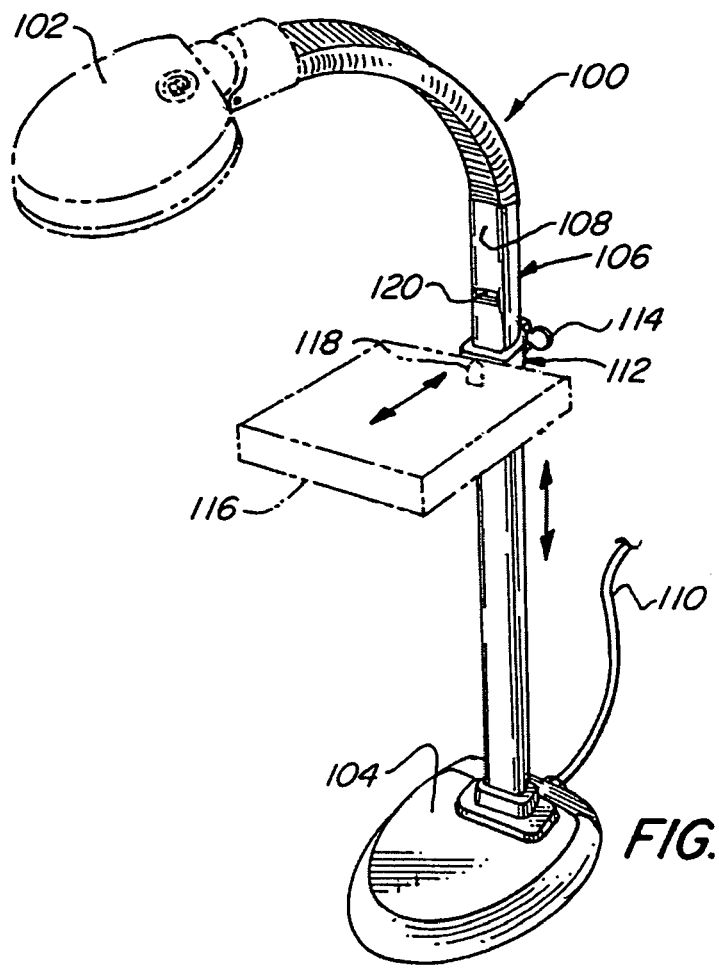
FIG. 1 is an illustration of one advantageous embodiment of the invention.

Referring now to the drawings, wherein like reference numerals designate corresponding structure throughout the views.

A light fixture assembly 100 is illustrated in FIG. 1. Light fixture assembly 100 comprises a head 102 for receiving a lamp (not shown). While head 102 is illustrated as a generally oval shape, it may comprise any desired shape and/or size and further may incorporate features such as a handle according to the application. The lamp (not shown) may comprise any type of lamping such as for instance, incandescent, compact fluorescent, halogen, metal halide, high pressure sodium, High Intensity Discharge (HID), or any other lamping appropriate for the application.

Also illustrated in FIG. 1 is base 104. Base 104 is provided to support light fixture assembly 100 in an upright position and may comprise any size, shape and/or weight which will vary depending upon the size and height of light fixture assembly 100.

Still further provided is stem 106 which is illustrated as an elongated member having generally flat front side 108. Stem 106 is received at a proximal end in base 104 and at a distal end by head 102. It should be noted that while distal end of stem 106 is illustrated as being flexible and adjustable this is not required. The distal end of stem 106 may be for instance, preformed to desired curvature or may be straight. Typically however, for task lighting it is preferable to be able to adjust the location of the head and therefore the direction of the lighting.

Head 102, base 104 and stem 106 may comprise any suitable material such as for instance, a rigid plastic, a metal composite or composition, or combinations thereof. In addition, light fixture assembly 100 may comprise any finish and color desired to match an interior design of a workspace.

Electrical power is supplied to light fixture assembly 100 via wiring 110, which may comprise any suitable material and/or design based upon the application.

Also illustrated in FIG. 1 is bracket 112. Bracket 112 is releasably connected to stem 106 such that it may be adjusted to substantially any position along the length of stem 106. Bracket 112 may comprise any suitable rigid material such as for instance, a rigid plastic, a metal composite or composition, or combinations thereof.

Bracket 112 is further illustrated with fastener 114, which in this embodiment comprises a screw that is engagable with stem 106 to firmly hold bracket 112 to stem 106 in substantially any desired position along the length of stem 106.

Still further illustrated in FIG. 1 is light fixture accessory 116, which is detachably connectable to bracket 112. Light fixture accessory 116 is detachably connectable to bracket 112 by means of interface 118 which can be seen in greater detail and will be discussed in connection with in FIGS. 2-3.

Also shown located on stem 106 is connector 120. Connector 120 may comprise a data and/or power connection. For instance, the data connection may comprise a Universal Serial Bus (USB) connector for connecting a computer peripheral (not shown) to a client workstation (not shown). Alternative USB connector layouts are further illustrated in FIGS. 14A and 14B. It is contemplated that many differing connection types may be desired and/or utilized. Still further, connector 120 may comprise an AC or DC power connector for power various pieces of equipment.

It is contemplated that the client workstation (not shown) may comprise any of personal computer and may run for instance, Microsoft Windows®. 95, 98, 2000, Millenium®, NT®, Windows CE®, Palm® OS, Unix®, Linux®, Solaris®, OS/2®, BeOS®, MacOS® or any other operating system or platform. Still further, it is contemplated that the client workstation (not shown) may also be or include any microprocessor-based machine such as an Intel® x86-based device or Motorola 68K or PowerPC device, microcontroller or other general or special purpose device operating under programmed control.

While connector 120 is illustrated at a particular location along the length of stem 106, it is contemplated that connector 120 may be located substantially anywhere along the length of stem 106. In addition, connector 120 may comprise one or more USB connectors variously located along a length of stem 106.

It should be noted that light fixture assembly 100 is shown in FIG. 1 with stem 106 cut away illustrating that the length of stem 106 will varying depending upon the desired application. For instance, stem 106 will be relatively short when light fixture assembly 100 is utilized as a desk lamp to be positioned on a work surface of a desk or table. Alternatively, stem 106 will be relatively long when light fixture assembly 100 is utilized as a floor lamp with base 104 placed on the floor and head 102 extending up and beyond a work surface to be illuminated.

Figure 2B:
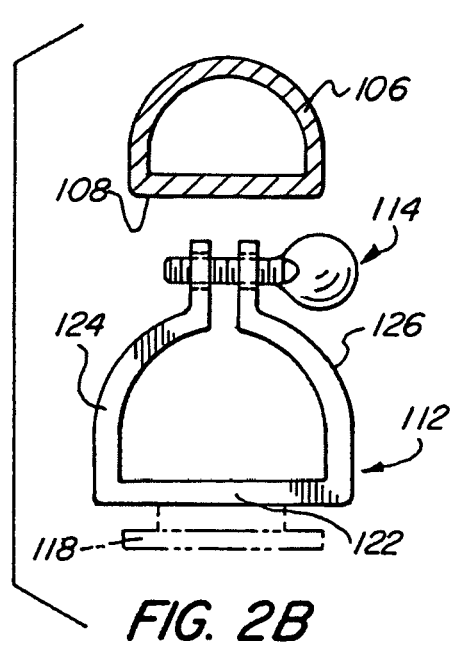
FIG. 2B is a top view of another advantageous embodiment of the bracket.
Figure 2A:
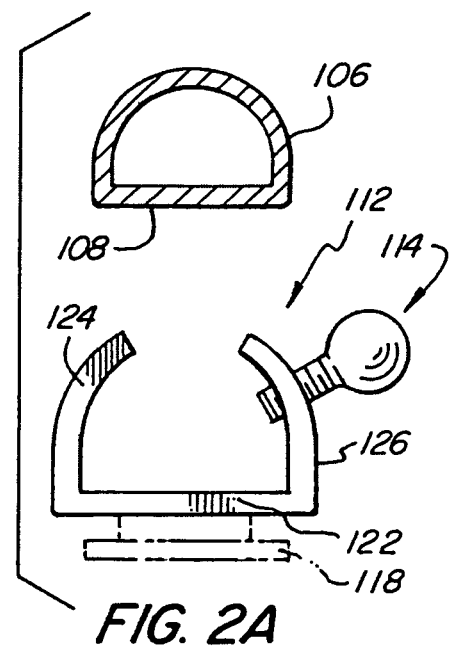
FIG. 2A is a top view of one advantageous embodiment of the bracket.

Referring now to FIGS. 2A and 2B, a top view of bracket 112 and cross-sectional view of stem 106 is illustrated. In FIGS. 2A and 2B bracket 112 may comprise any suitable material such as for instance, a rigid plastic, a metal composite or composition, or combinations thereof.

As can be seen from FIG. 2A, bracket 112 in this advantageous embodiment comprises a generally flat portion 122 that mates against flat front side 108 of stem 106. Bracket 112 further comprises sides (124, 126) each of which are connected on one end to opposite sides of flat portion 122. The opposite ends of sides (124, 126) that are not connected to flat portion 122 curve slightly inward toward each other forming a partially closed collar, with sides (124, 126) generally follow a curvature of a back side of stem 106. While bracket 112 is shown as a partially closed collar, it is contemplated that bracket 112 may be fully closed or open to a greater degree than illustrated.

Also shown in FIG. 2A is fastener 114, which in this embodiment comprises a screw that is engagable with stem 106. Fastener 114 in this embodiment directly engages with stem 106 such that upon tightening of the screw, bracket 112 will be rigidly held in place relative to stem 106.

FIG. 2B illustrates another embodiment of bracket 112 shown generally as a clamp arrangement.

Again, a generally flat portion 122 of bracket 112 mates against flat front side 108 of stem 106, while sides (124, 126) are each connected on one end to opposite sides of flat portion 122. In this embodiment, opposite ends of sides (124, 126) extend toward each other to form a clamp arrangement with fastener 114, comprising a screw, connecting the opposite sides to each other such that upon tightening of the screw, sides (124, 126) will be drawn inward to engage with stem 106 to rigidly hold bracket 112 in place relative to stem 106.

FIGS. 2A and 2B further shown interface 118 illustrated in dashed lines and will be discussed in connection with FIGS. 3A-3C.

Referring now FIGS. 3A-3C and 4A-4C, these are perspective views of various advantageous embodiments of the present invention illustrating various configurations for interface 118.

Figure 3A:
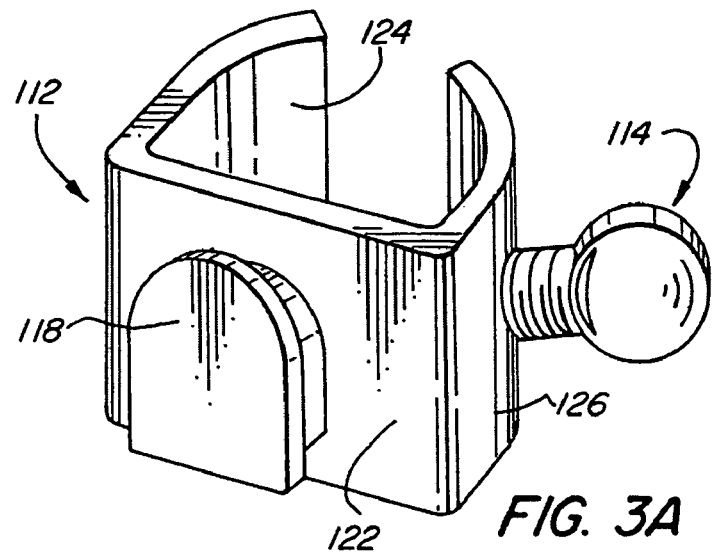
FIG. 3A is a perspective view of the bracket according to FIG. 2A with a sliding connector interface.

For instance, FIG. 3A illustrates interface 118 in a sliding connector configuration with interface 118 comprising a tombstone shape, i.e. having an elongated height with a squared off lower portion and a rounded upper portion. FIG. 4A further illustrates this embodiment using a sliding connector configuration. The tombstone shaped connector is illustrated having a base section 128 that is connected to flat portion 122 of bracket 112 and an upper section 130 that has a lip 132 that extends beyond base section 128. Also illustrated in FIG. 4A is light fixture accessory 116 with opening 134, which is dimensioned to receive the tombstone shaped connector, which may be slid into opening 134 from below as indicated by the arrow. Opening 134 is dimensioned to be slightly larger than base section 128 but slightly smaller than upper section 130 such that lip 132 retains the tombstone shaped connection in opening 134.

Figure 3C:
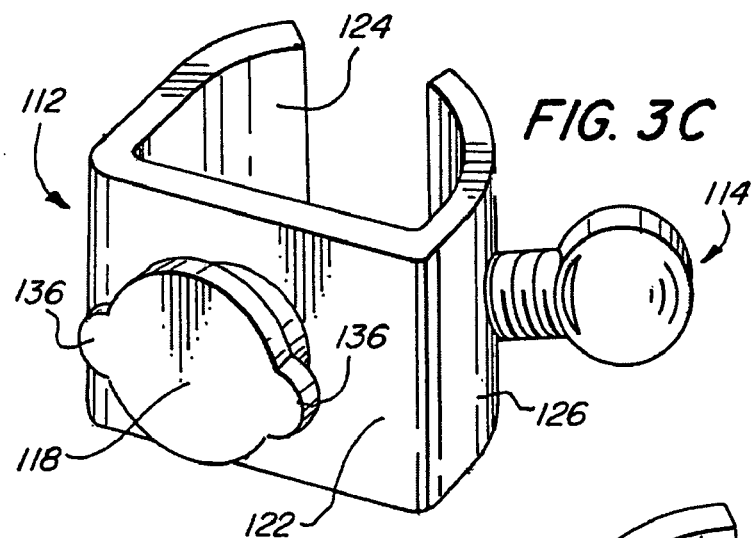
FIG. 3C is a perspective view of the bracket according to FIG. 2A with a bayonet connector interface.
Figure 3B:
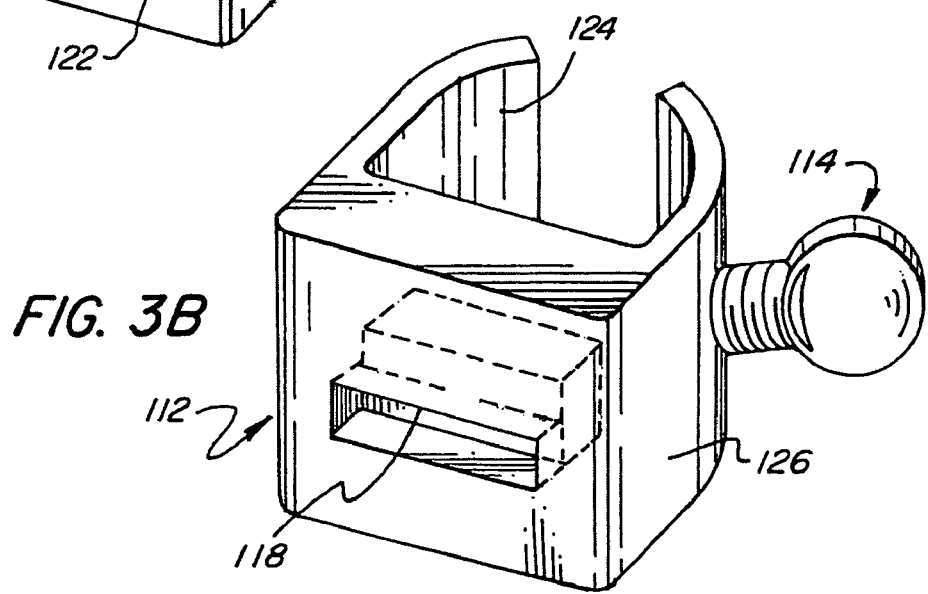
FIG. 3B is a perspective view of the bracket according to FIG. 2A with a slot connector interface.

In another advantageous embodiment, FIG. 3B illustrates interface 118 in a slot connector configuration with interface 118 comprising an elongated rectangular shaped opening. FIG. 4B further illustrates a side view of this advantageous embodiment using a slot connector configuration. Interface 118 here comprises a dog-legged shaped connector 138 which may be attached to light fixture accessory 116. Connector 138 is slid into the elongated rectangular shaped opening at an angle until it seats against a shoulder portion 140 of interface 118. In addition, lip 142 extends downward to engage with connector 138 such that it retains connector 138 in the elongated rectangular shaped opening.

In still another advantageous embodiment, FIG. 3C illustrates interface 118 in a bayonet connector configuration with interface 118 comprising a circular shape having protrusions 136 extending from opposing sides of interface 118. FIG. 4C further illustrates this embodiment using a bayonet connector configuration. The circular shaped connector is illustrated having a base section 128 that is connected to flat portion 122 of bracket 112 and an upper section 130 that has protrusions 136 that extends beyond base section 128. still further illustrated in FIG. 4C is light fixture accessory 116 with opening 134, which is dimensioned to receive the circular shaped connector, which may be inserted into opening 134 from the front as indicated by the arrow. Opening 134 is dimensioned to be slightly larger than base section 128 and upper section 130, but slightly smaller than protrusions 136 such that upon a twisting motion as indicated by the arrows, protrusions 136 engage with the edges of opening 134 to retain the circular shaped connection in open 134.

Figure 5:
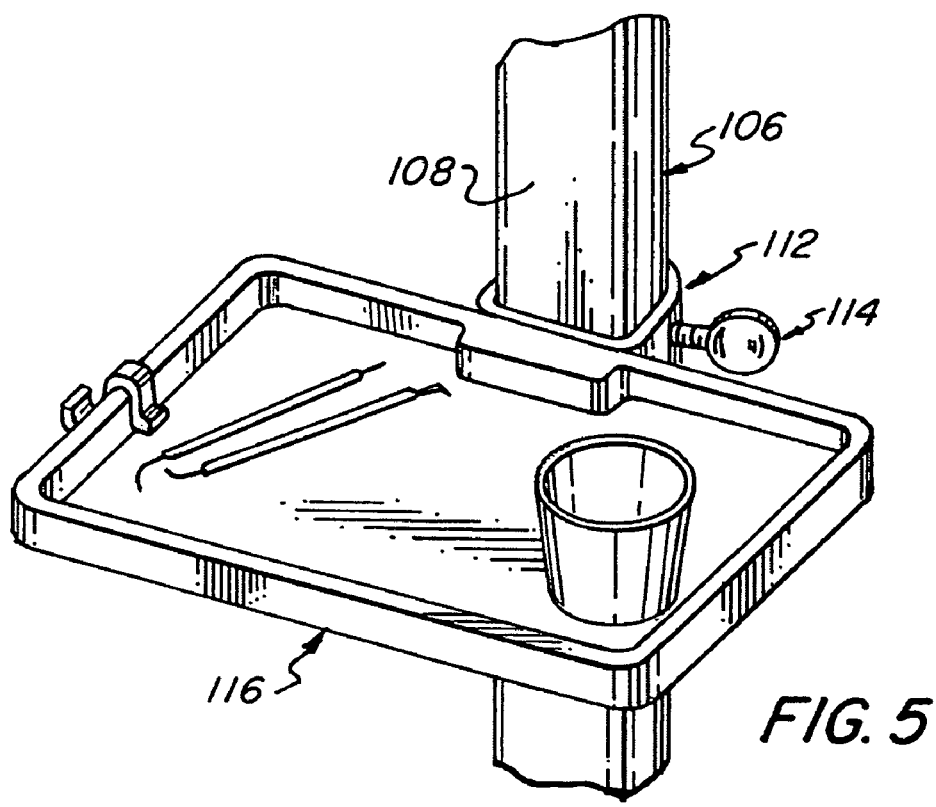
FIG. 5 is a perspective view of a tray attachment according to FIG. 1.
Figure 6:
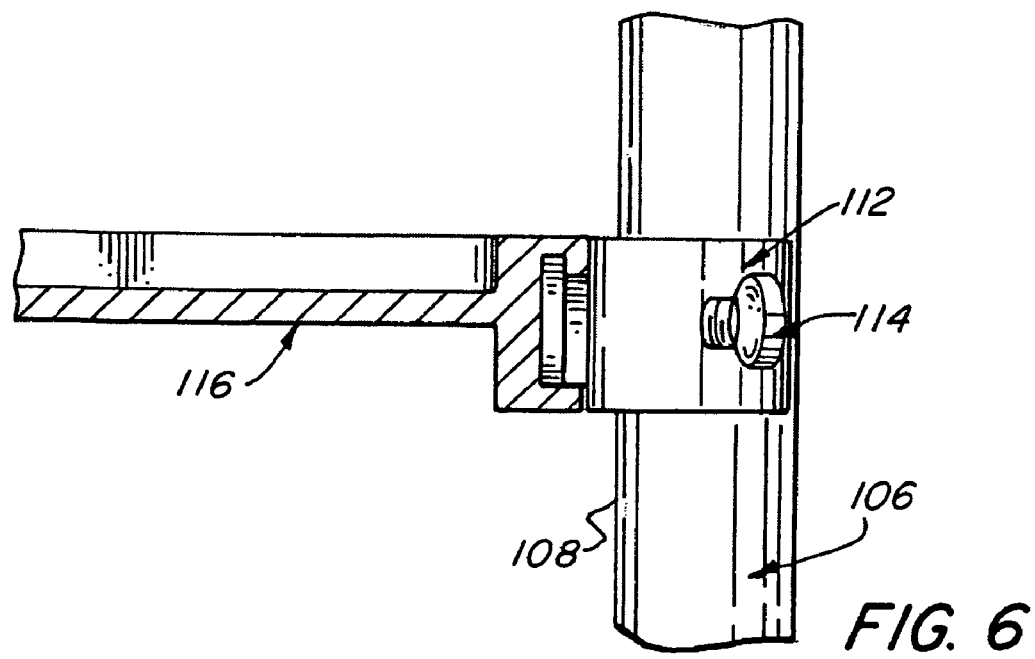
FIG. 6 is a side view of the tray attachment according to FIG. 5.

FIGS. 5 and 6 illustrate a further embodiment of the present invention with light fixture accessory 116 comprising a tray attachment. In this embodiment, tray attachment may utilize for instance, any of the interface 118 embodiments discussed in connection with FIGS. 3A-3C and 4A-4C.

FIG. 5 is a perspective view of the tray attachment, while FIG. 6 comprises a side view. Tray attachment may be utilized with light fixture assembly 100 whether it is a desk lamp or a floor lamp providing additional working space for the individual. It is contemplated that tray attachment will comprise a sturdy material such as for instance a rigid plastic so that it may be utilized to hold relatively heavy objects such as for example, a computer peripheral thereby freeing up surface working space on for instance, an individuals desk. Bracket 112 and therefore the tray attachment is fully adjustable along the length of stem 106 such that the height of the computer peripheral relative to the work surface may be adjusted as desired. In addition, a USB connector is provided in stem 106 for connection of the computer peripheral to the computer, with wiring for the USB connector running along the interior of stem 106 to further reduce clutter in and around the worksurface.

Figure 7:
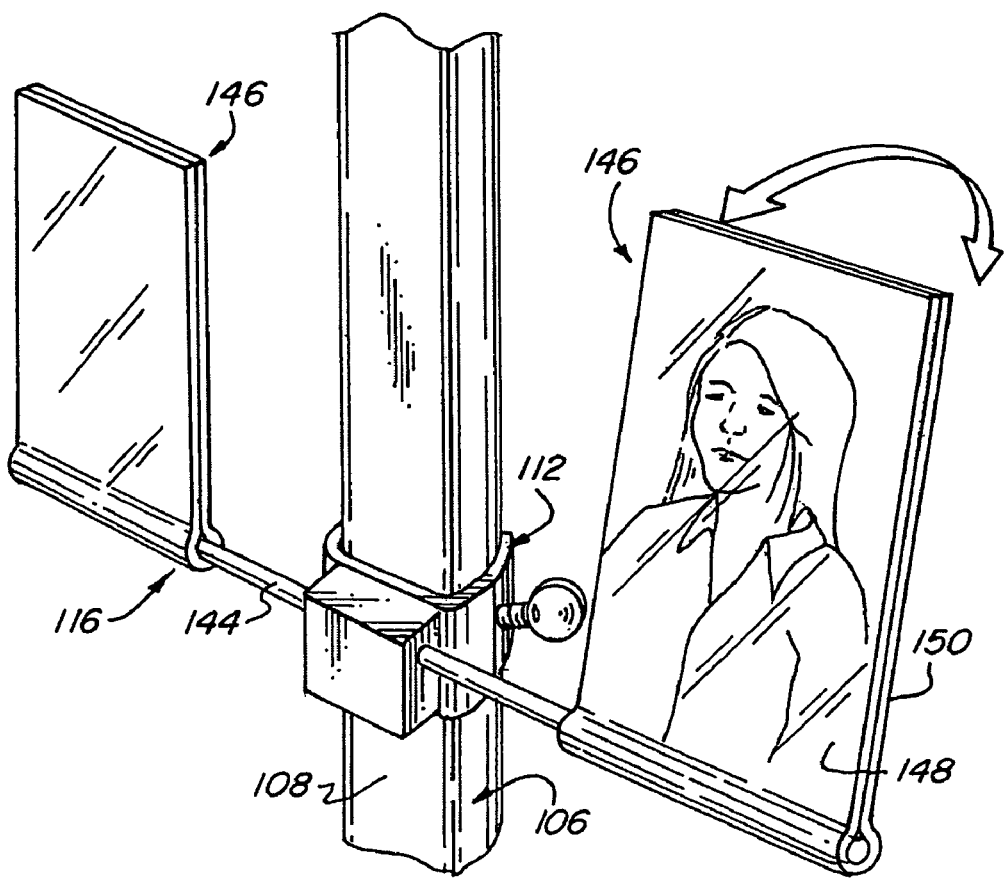
FIG. 7 is a perspective view of a picture frame attachment according to FIG. 1.
Figure 8:
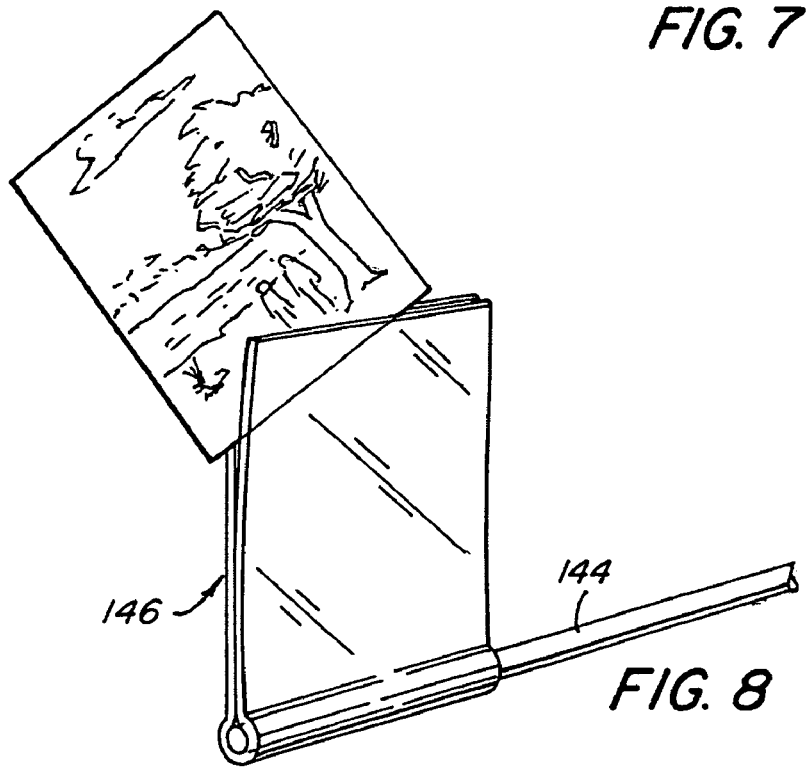
FIG. 8 is another perspective view of the picture frame attachment according to FIG. 7.

FIGS. 7 and 8 illustrate a further embodiment of the present invention with light fixture accessory 116 comprising a picture frame attachment. Again, this embodiment of light fixture accessory 116 may effectively utilize any of the interface 118 embodiments discussed in connection with FIGS. 3A-3C and 4A-4C.

The picture frame attachment includes a supporting rod 144 that extends generally perpendicular to stem 106 and outward from bracket 112. Attached at opposing ends of supporting rod 144 are picture frames 146, which may be variously sized (i.e. 4×6, 5×7, 6×8, etc.) to hold a picture(s). Picture frames 146 are provided having a front transparent portion 148 and a rear portion 150 such that a picture may be inserted between the two portions and be securely held therein (FIG. 8). Picture frames 146 may comprise any suitable transparent material such as for instance, a semi-rigid transparent plastic or acrylic. In addition, rear portion 150 may or may not comprise a transparent material. It is further contemplated that bracket 112 is provided such that supporting rod 144 is rotatably adjustable relative to bracket 112 and/or picture frames 146 are rotatably adjustable about supporting rod 144. It is still further contemplated that picture frames 146 are detachably connectable to supporting rod 144 such that for instance, differing sized picture frames 146 may be attached thereto.

Figure 9:
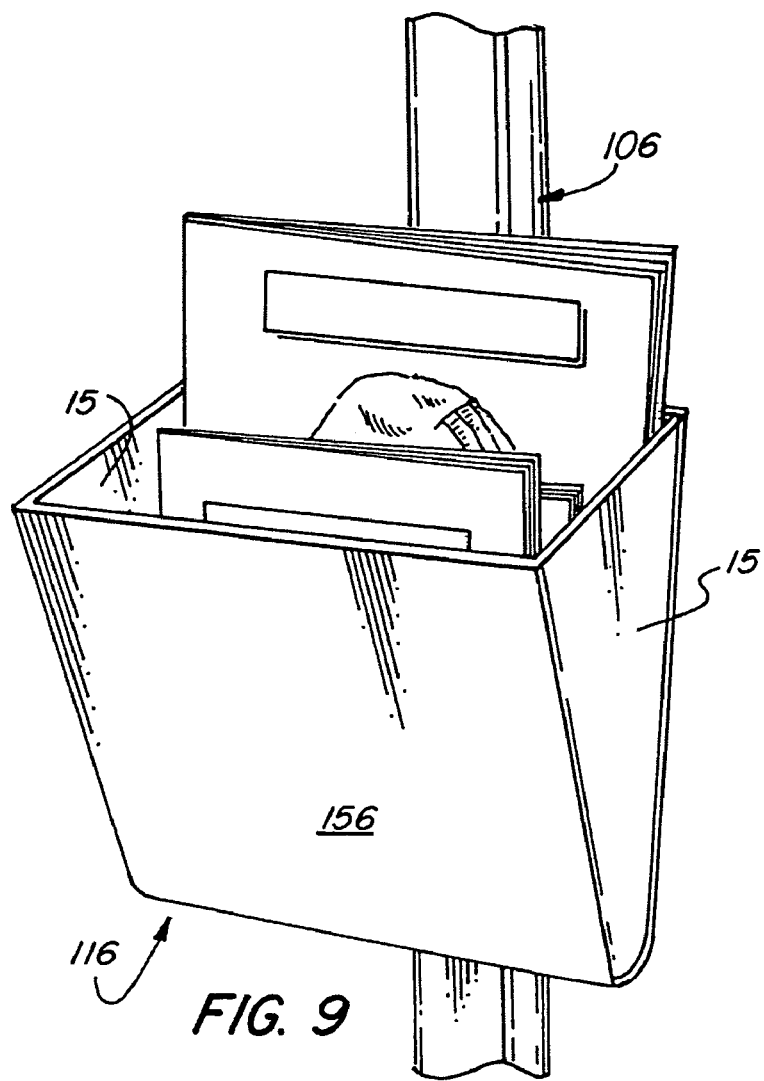
FIG. 9 is a perspective view of an article holder attachment according to FIG. 1.
Figure 10:
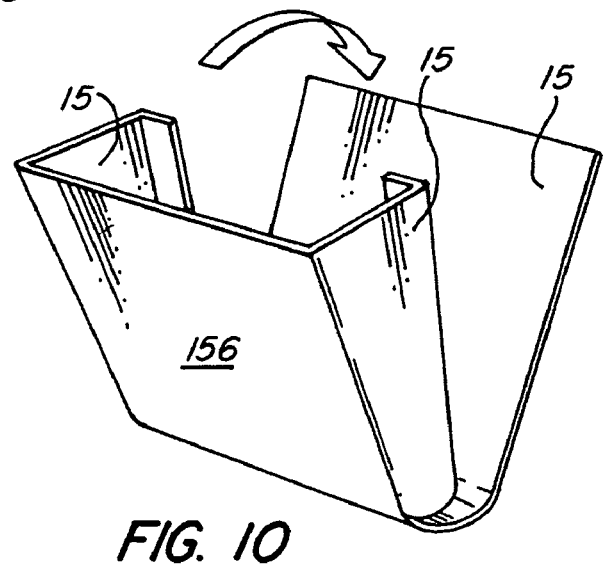
FIG. 10 is another perspective view of the article holder attachment according to FIG. 9.

FIGS. 9 and 10 illustrate still another embodiment of the present invention with light fixture accessory 116 comprising a article holder attachment. This embodiment of light fixture accessory 116 may also utilize any of the interface 118 embodiments discussed in connection with FIGS. 3A-3C and 4A-4C.

The article holder attachment is generally shaped to hold for instance, magazines, books and/or periodicals having a open top for insertion of articles therein as illustrated in FIG. 9. Still further, it is contemplated that the article holder may have a rear wall 152 that is detachably connectable to side walls 154 and is connected at a bottom edge to a front wall 156. The article holder may be sized to accommodate for instance, an 8½×11 magazine, but any size may be used as desired.

Figure 11:
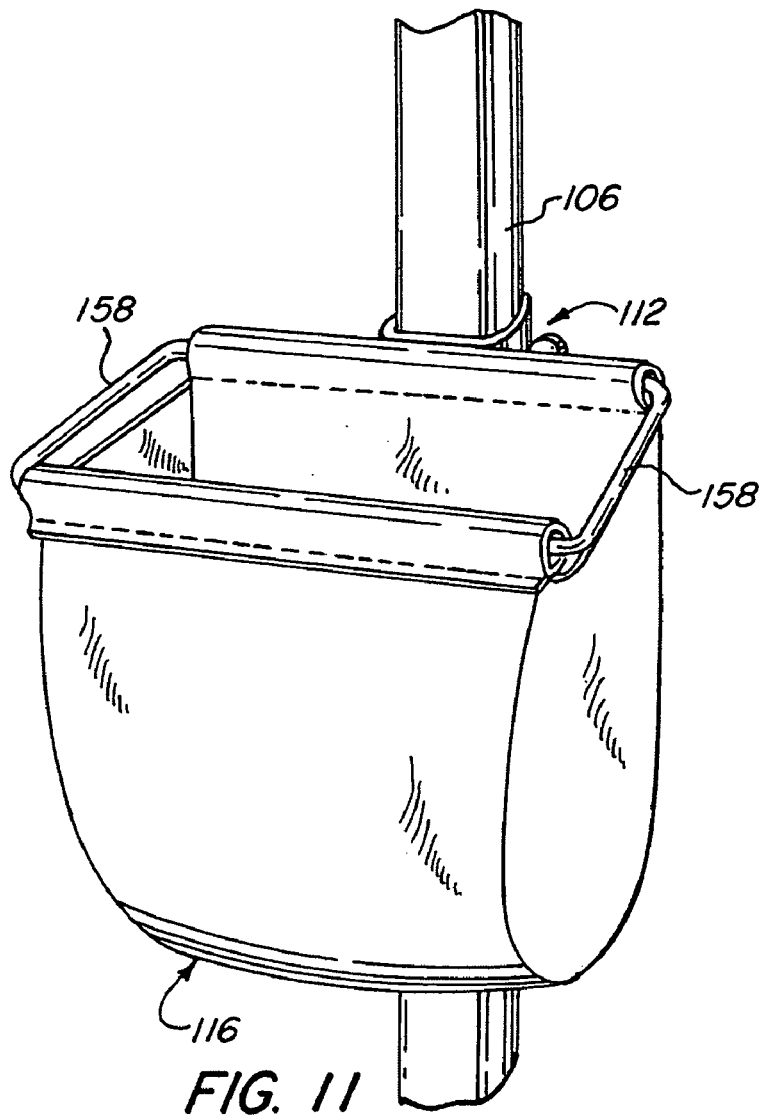
FIG. 11 is a perspective view of a utility basket attachment according to FIG. 1.
Figure 12:
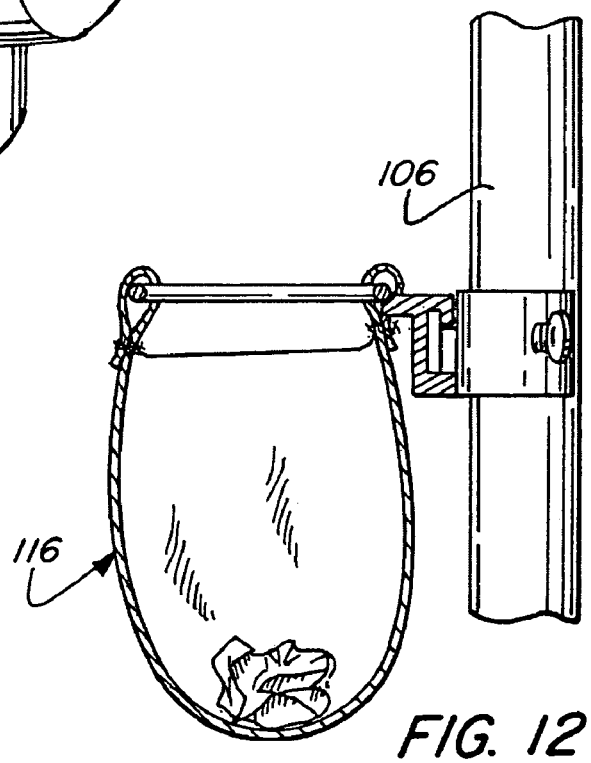
FIG. 12 is another side view of the utility basket attachment according to FIG. 11.

FIGS. 11 and 12 illustrate yet another embodiment of the present invention with light fixture accessory 116 comprising a utility basket attachment, which may be attached to bracket 112 by means of interface 118 as previously discussed in connection with FIGS. 3A-3C and 4A-4C.

The utility basket may comprise for instance, an open top container as illustrated in FIG. 11. The utility basket is provided with a rigid frame 158 defining the top opening to which the utility basket material is attached. The utility basket may comprise any size desired and by be utilized for instance, as a waste basket (FIG. 12) or as a container to hold article that would normally take up working space on the work surface. Again, the utility basket, by means of bracket 112, may be adjusted to substantially any height along the length of stem 106.

Figure 13:
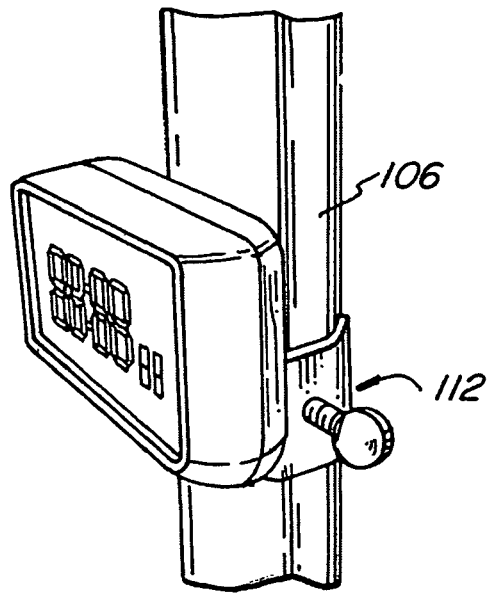
FIG. 13 is a perspective view of a clock attachment according to FIG. 1.

FIG. 13 is an illustration of still another embodiment of the light fixture accessory 116 comprising a clock attachment which may be attached to bracket 112 by means of interface 118 as previously discussed.

Figure 14A:
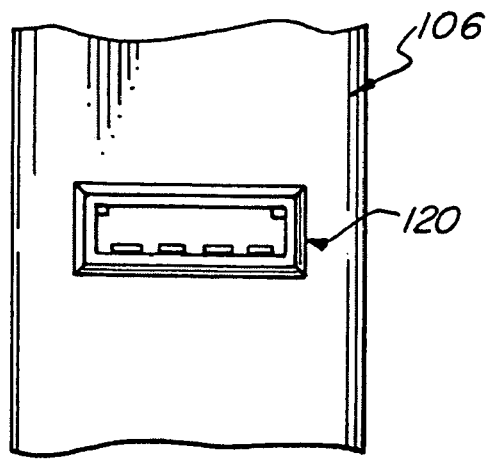
FIG. 14A is an illustration of a USB series "A" connector according to FIG. 1.
Figure 14B:
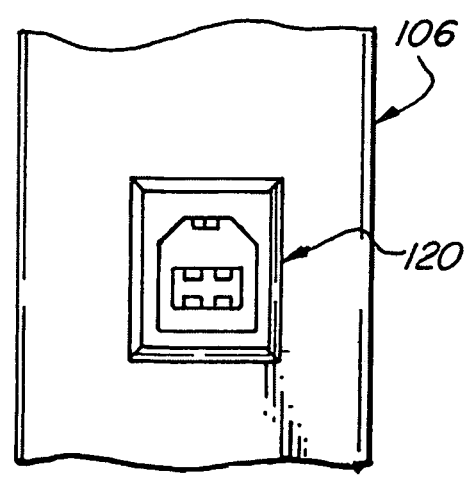
FIG. 14B is an illustration of a USB series "B" connector according to FIG. 1.

FIGS. 14A and 14B illustrate alternative embodiments of connector 120 in greater detail. Connector 120 may comprise for instance, a USB connector for connecting an electronic device (not shown) to a client workstation (not shown), such as a personal computer.

FIG. 14A illustrates a USB series "A" type plug, while FIG. 14B illustrates a USB series "B" type plug, both of which are variously used with electronic devices and peripheral devices. Wiring for connector 120 may extend through an interior space (not shown) of stem 106 and out through base 104 for connection to the client workstation (not shown). This wiring may be integral to wiring 110 or may be run separately.

In addition, it is contemplated that any number of connectors 120 may be situated along the length of stem 106 as desired. Still further in one advantageous embodiment, connector 120 is flush mounted to stem 106 to facilitate adjustment of bracket 112 to substantially any position along the length of stem 106.

Figure 15:
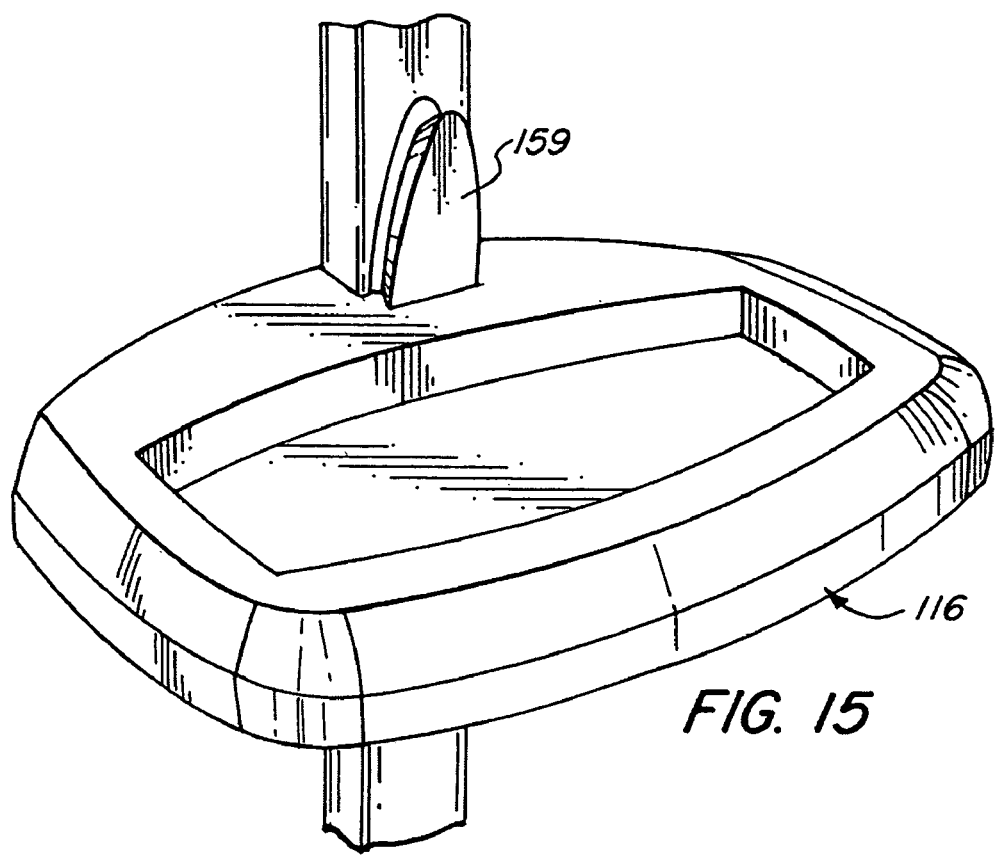
FIG. 15 is an illustration of another embodiment of the present invention illustrating a tray attachment.
Figure 16:
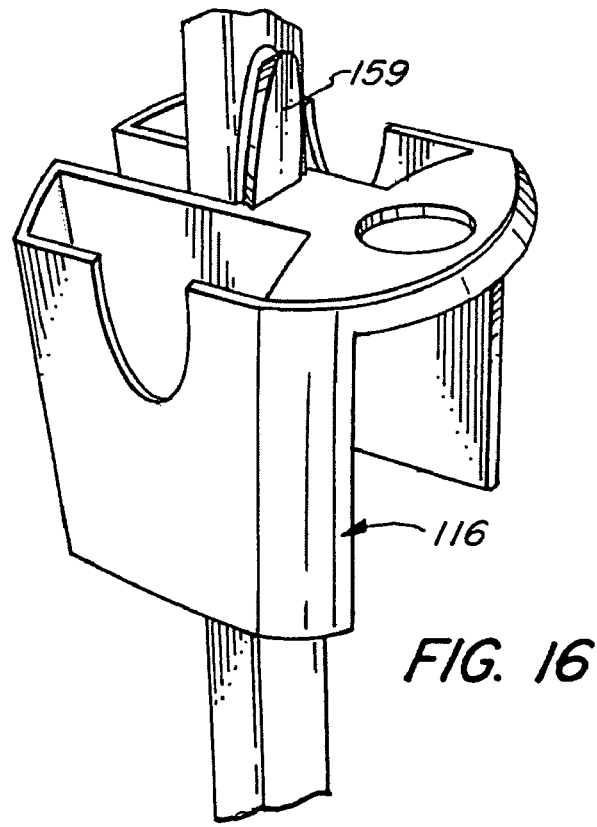
FIG. 16 is an illustration of still another embodiment of the present invention illustrating a saddle-bag tray attachment.

FIG. 15 is another embodiment of the light fixture accessory 116 comprising another tray attachment. FIG. 16 is still another embodiment of the light fixture accessory 116 comprising a saddle-bag tray attachment. An elongated attachment portion 159 is provided on the tray attachment illustrated in FIGS. 15 and 16, which is designed to abut stem 108.

Light fixture accessory 116 may in one advantageous embodiment be permanently attached to stem 108 in a selected or desired location. For instance, light fixture accessory 116 may engage with a notch located in stem 108 or be attached in a non-removable manner.

It is contemplated that the tray attachments in FIGS. 15 and 16 may comprise any desired material and/or color. Typically the tray attachments will comprise a molded or formed polymer material providing a rugged and light weight tray attachment.

Figure 17A:
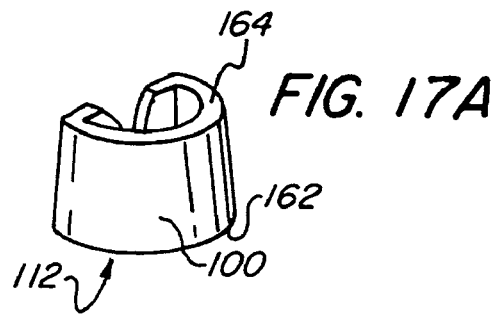
FIG. 17A is an illustration of one advantageous embodiment of the bracket.
Figure 17B:
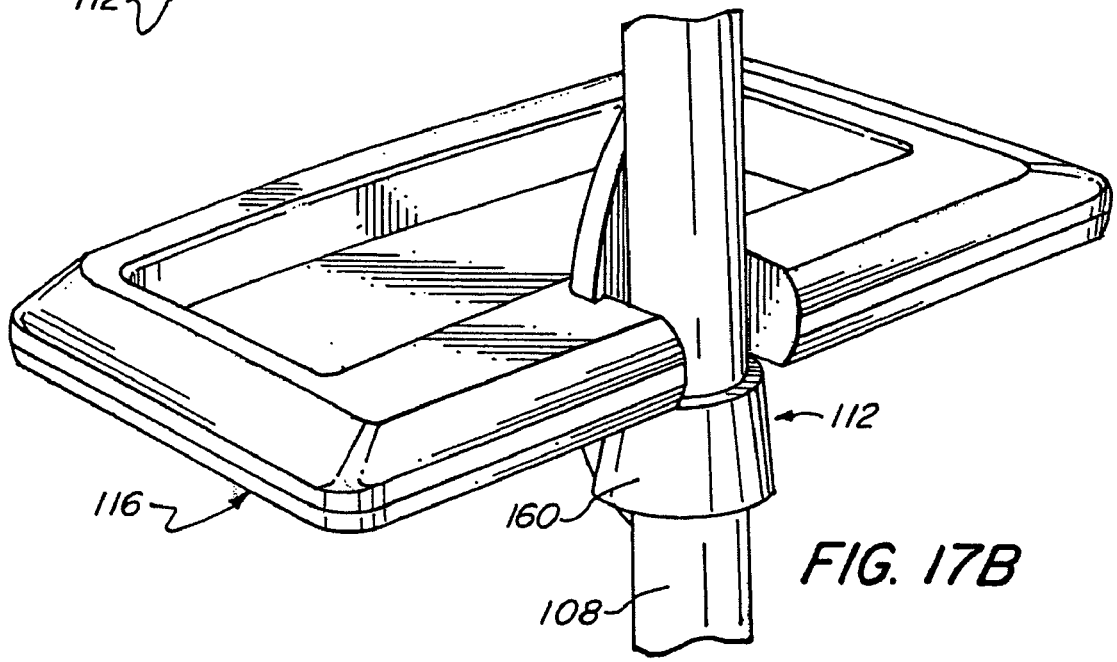
FIG. 17B is an illustration of the connection of a tray attachment to the bracket according to FIG. 17A.
Figure 17C:
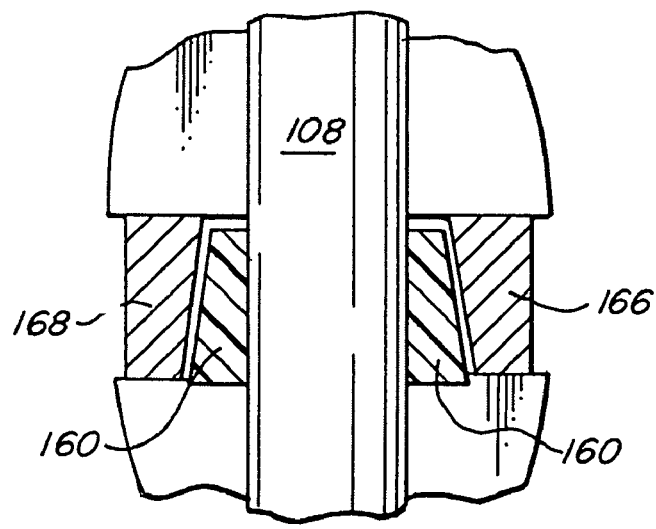
FIG. 17C is a sectional view of the bracket and tray engaged according to FIG. 17B.

FIG. 17A is an advantageous embodiment of bracket 112. In this embodiment, bracket 112 comprises a frusto-conical surface 160, being larger in diameter at a bottom portion 162 than a top portion 164. In this embodiment bracket 112 is elastically deformable such that it is detachably connectable to stem 108. Once attached to stem 108, bracket 112 may be slid along a length of stem 108 to any desired position. After stem 108 is adjusted to a desired position, light fixture accessory 116 may then be attached to bracket 112 by fitting light fixture accessory 116 over bracket 112 as illustrated in FIG. 17B. Light fixture accessory 116 is provided with walls 166, 168 which engage with frusto-conical surface 160 as shown in FIG. 17C to create an interference fitting. As walls 166, 168 of light fixture accessory 116 engage with frusto-conical surface 160, bracket 112 is compressed about stem 108 such that bracket 112 essentially locks into position and is no longer slidable along the length of stem 108. To disengage bracket 112 such that it may be adjusted to another position along the length of stem 108, one simply applies an upward force on light fixture accessory 116 to detach it from bracket 112, which in turn releases the inward pressure on bracket 112.

Figure 18A:
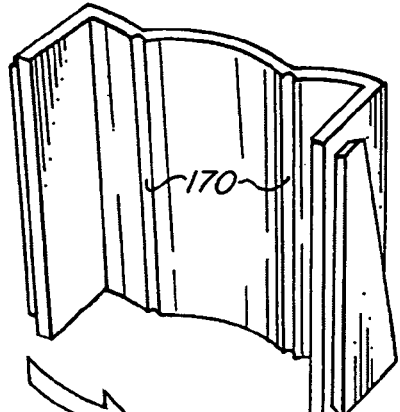
FIG. 18A is an illustration of still another advantageous embodiment of the bracket.
Figure 18B:
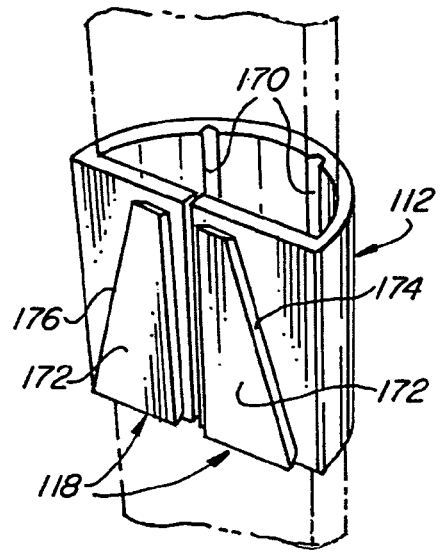
FIG. 18B is an illustration of the mounting of the bracket according to FIG. 18A.

FIG. 18A is still another embodiment of bracket 112. In this embodiment, bracket 112 is provided with living hinges 170 such that bracket 112 may be opened to fit around stem 108 as illustrated in FIG. 18B. Bracket 112 in this embodiment is provided with interface 118, which comprises a frusto-conical section as seen in FIG. 18B.

Figure 18C:
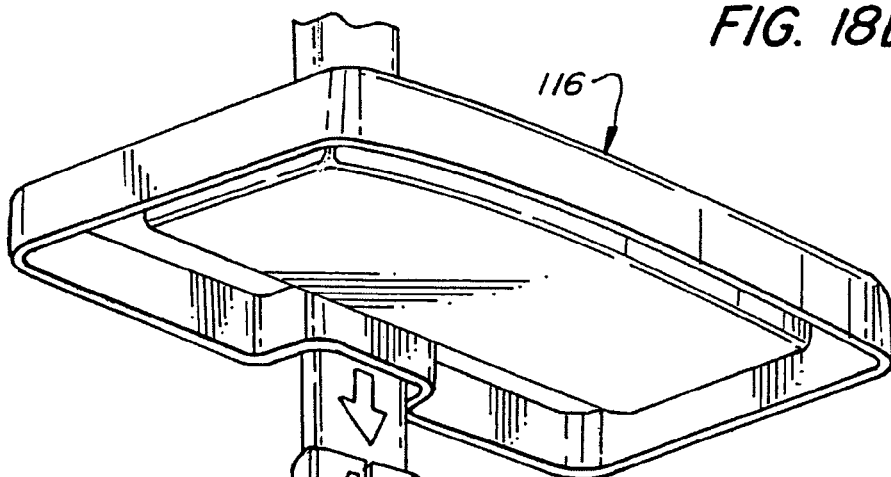
FIG. 18C is an illustration of the connection of a tray attachment to the bracket according to FIG. 18B.
Figure 18D:
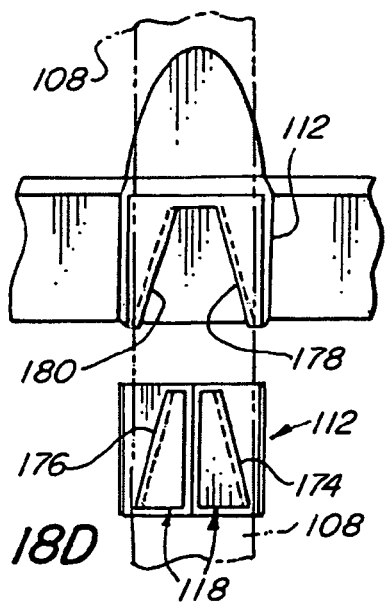
FIG. 18D is cross sectional view of the connection of a tray attachment to the bracket according to FIG. 18B.

Interface 118 is provided with front surface 172, which is designed to fit against fitting light fixture accessory 116. Interface 118 is also provided with outer walls 174, 176 that taper inward and upward to firmly hold light fixture accessory 116 to bracket 112 once engaged. The upward taper of walls 174, 176 serves to compress interface 118 to stem 108 as light fixture accessory 116 is firmly seated thereon forming an interference connection. In addition, the inward taper of walls 174, 176 serves to hold light fixture accessory 116 firmly to bracket 112 once seated thereon. Attachment of light fixture accessory 116 to bracket 108 is a simple matter as shown in FIG. 18C. Light fixture accessory 116 is merely slid down on top of bracket 112 such that walls 178, 180 of light fixture accessory 116 engage with walls 174, 176 of interface 118 as illustrated in FIG. 18D. To release bracket 112 is the same procedure as disclosed in connection with FIGS. 17A-C, one simply applies an upward force on light fixture accessory 116 to detach it from bracket 112, which in turn releases the inward pressure on bracket 112.

Figure 19A:
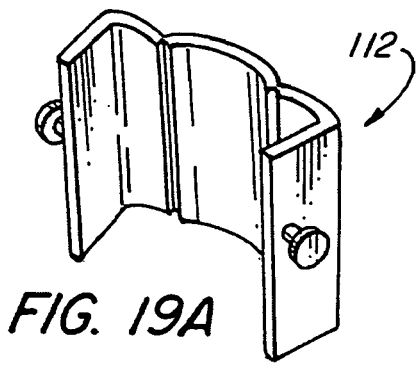
FIG. 19A is an illustration of another advantageous embodiment of the bracket.
Figure 19B:
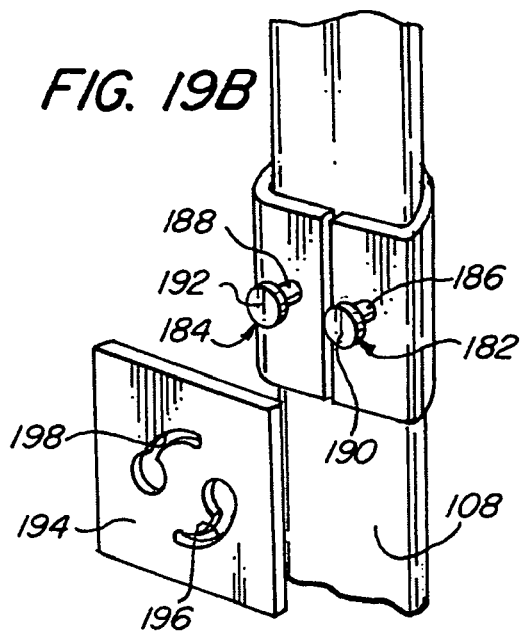
FIG. 19B is an illustration of the mounting of the bracket according to FIG. 19A.

FIG. 19A is yet another embodiment of bracket 112. In this embodiment bracket 112 comprises an elastically deformable material that may be fit around stem 108 as illustrated in FIG. 19B. Bracket 112 further comprises protrusions 182, 184 that include posts 186, 188 with end portions 190,192 respectively. As illustrated in FIG. 19B, a plate 194 is further provided having arcuate slots 196, 198 designed to engage with protrusions 182,184 respectively.

Figure 19C:
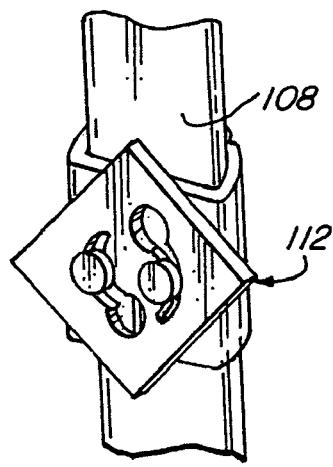
FIG. 19C is an illustration of the locking of the bracket according to FIG. 19B.
Figure 19D:
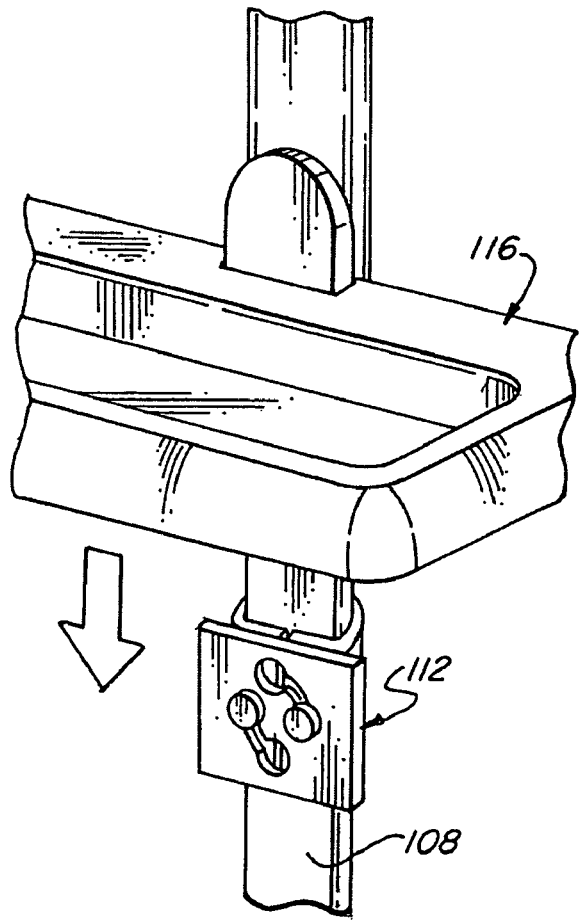
FIG. 19D is an illustration of the connection of a tray attachment to the bracket according to FIG. 19C.

As can be seen in FIG. 19C, plate 194 is fitted onto protrusions 182, 184 and is then rotated as shown to lock bracket 112 to stem 108. Arcuate slots 196, 198 spiral inward such that when plate 194 is turned as indicated in FIG. 19C, bracket 112 is drawn inward thereby clamping to stem 108. Once plate 194 is firmly attached to bracket 112, light fixture accessory 116 may then be attached to bracket 112 as shown in FIG. 19D. light fixture accessory 116 may comprise for instance, slots 200, 202 (FIG. 20A) that can engage with plate 194.

Removal may be accomplished by lifting up of light fixture accessory 116 to detach it from plate 194, and then twisting plate 194 in the reverse direction than the direction applied. This in turn releases the inward pressure on bracket 112 such that it may again be adjusted along the length of stem 108.

While some embodiments of bracket 112 teach use of a elastically deformable material or use of living hinges, it is contemplated that both are interchangeable with each other and either may be utilized in any of the embodiments.

Figure 20A:
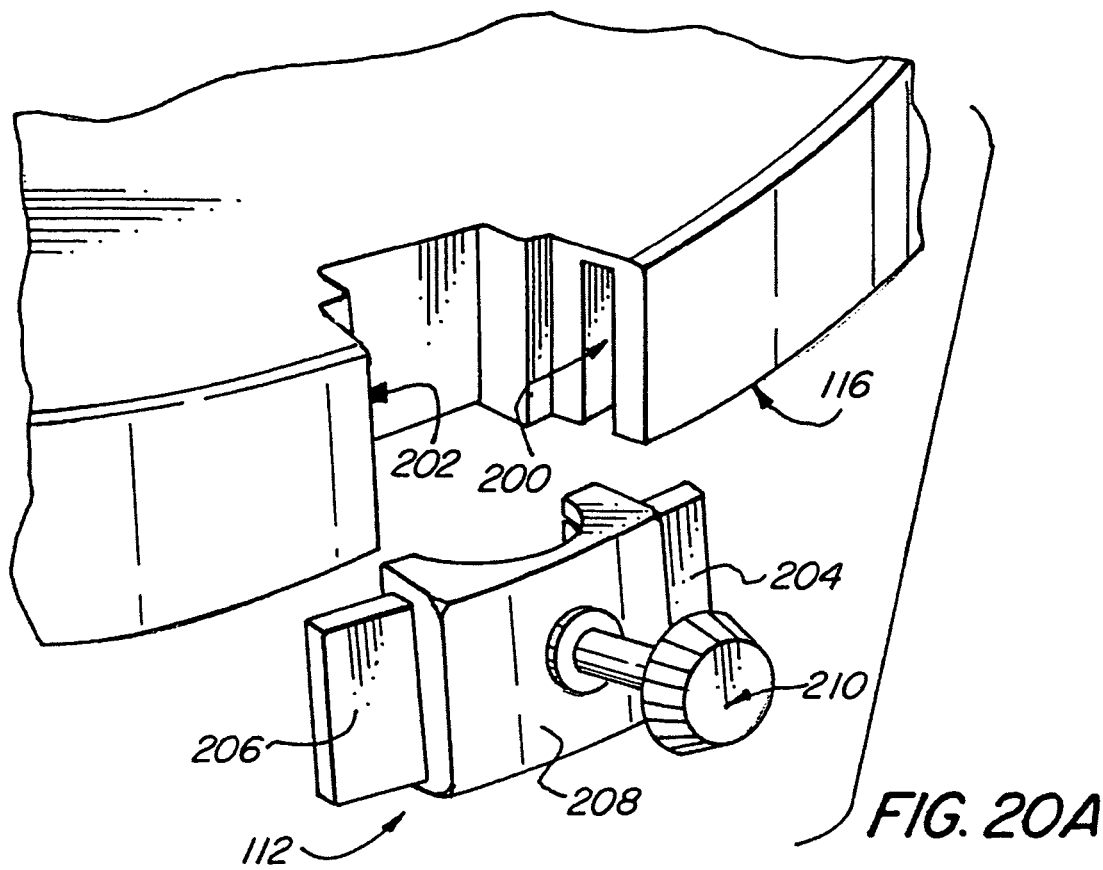
FIG. 20A is an illustration of another advantageous embodiment of the bracket and a tray attachment.

FIG. 20A is still another embodiment of bracket 112 and light fixture accessory 116. In this embodiment, bracket 112 comprises a rear mounted bracket assembly having protrusions 204, 206 extending from a body portion 208 of bracket 112. Protrusions 204, 206 are designed to engage with slots 200, 202 located in light fixture accessory 116 respectively. Also provided on bracket 112 in this embodiment is fastener 210.

Figure 20B:
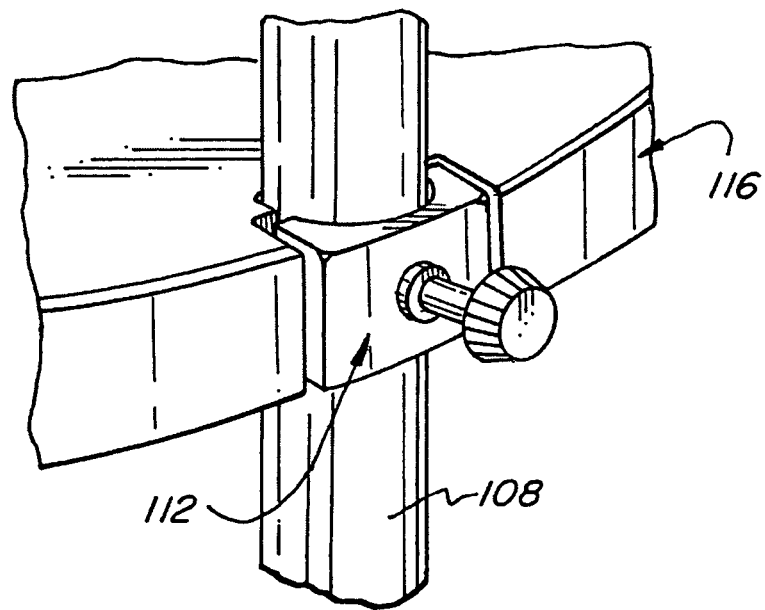
FIG. 20B is an illustration of the mounting of the bracket to the tray attachment according to FIG. 20A.

Application of bracket 112 is a simple matter as illustrated in FIG. 20B. Light fixture accessory 116 is abutted to stem 108 while bracket 112 is slid upward along stem 108 such that protrusions 204, 206 engage with slots 200, 202. Once protrusions 204, 206 are fully seated in slots 200, 202, fastener 210 may be rotated to engage with stem 108 to firmly hold bracket 112 to stem 108.

Figure 21A:
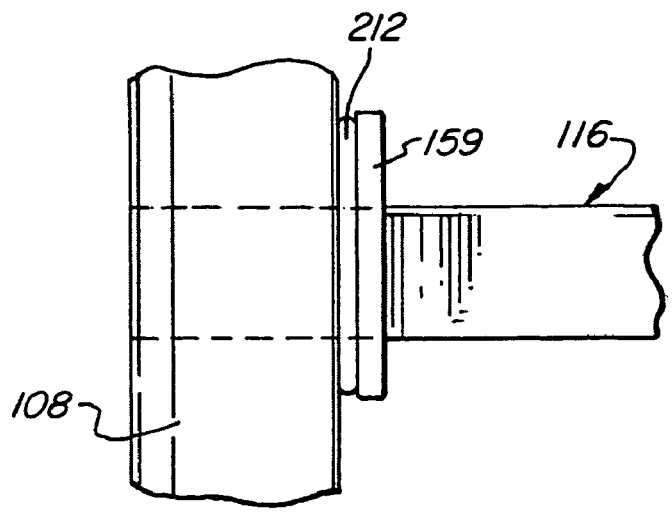
FIG. 21A is an illustration of another advantageous embodiment illustrating a mounting element and a tray attachment.

FIG. 21A is still another embodiment of the present invention. In this embodiment light fixture accessory 116 is provided with elongated attachment portion 159. Mounting element 212 is provided to attach light fixture accessory 116 to stem 108 at a selected position. Mounting element 212 may comprise any means for attaching elongated attachment portion 159 to stem 108 and in one advantageous embodiment comprises for instance, two-sided tape, Velcro or any other appropriate attachment means.

Figure 21B:
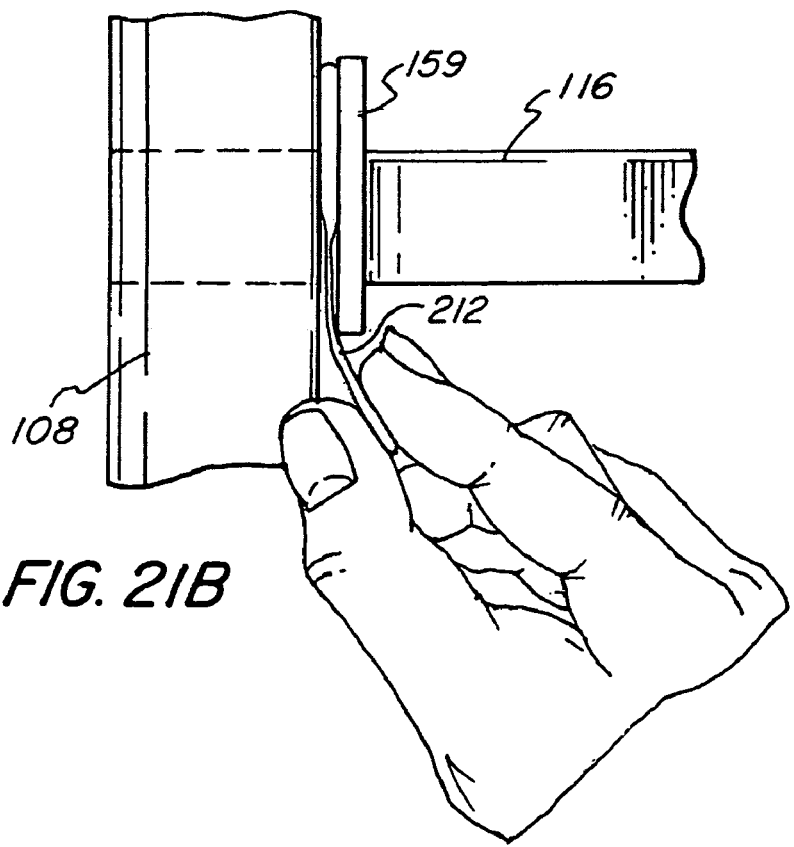
FIG. 21B is an illustration of removal of the mounting element according to FIG. 21A.

Once the two-sided tape is affixed to stem 108, elongated attachment portion 159 may then be affixed to the second side of the tape. Adjustment of light fixture accessory 116 along stem 108 may happen if the tape is removed as illustrated in FIG. 21B. The two-sided tape may simply be pulled along the length of stem 108 causing the adhesive to detach from both elongated attachment portion 159 and stem 108. Readjustment along stem 108 would then require affixing additional two-sided tape at the next selected location.

Figure 22A:
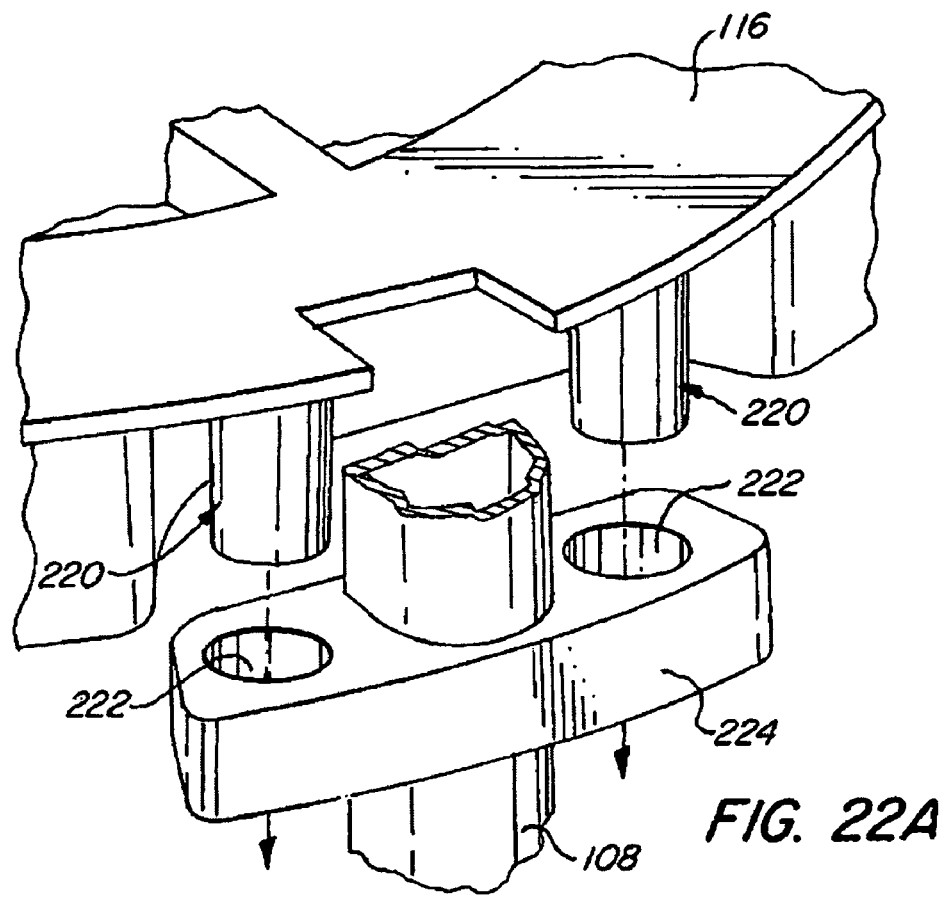
FIG. 22A is an illustration of another advantageous embodiment of the bracket and tray attachment.
Figure 22B:
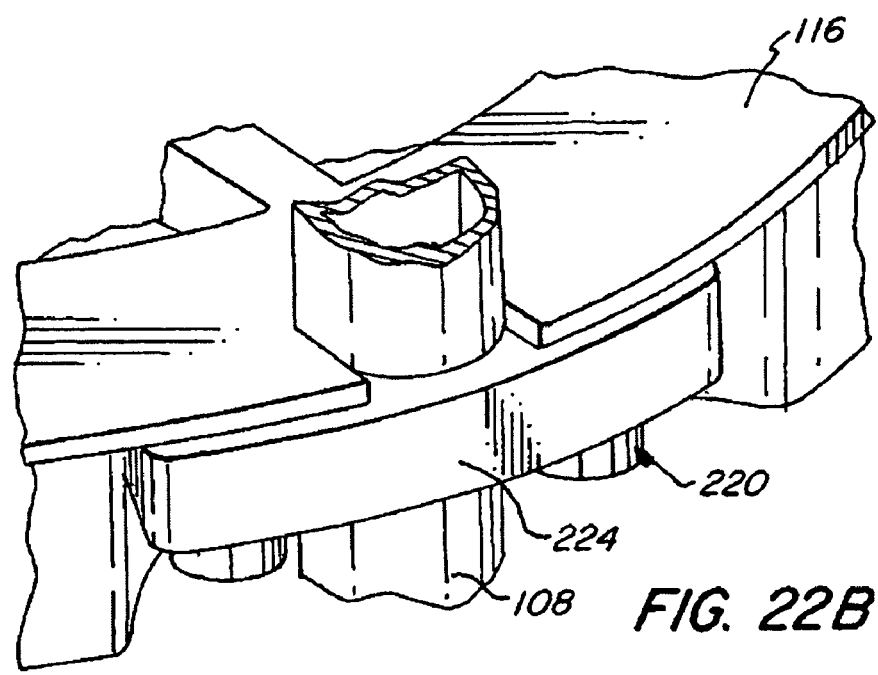
FIG. 22B is an illustration of the mounting of the tray attachment to the mounting element according to FIG. 22A.
Figure 22C:
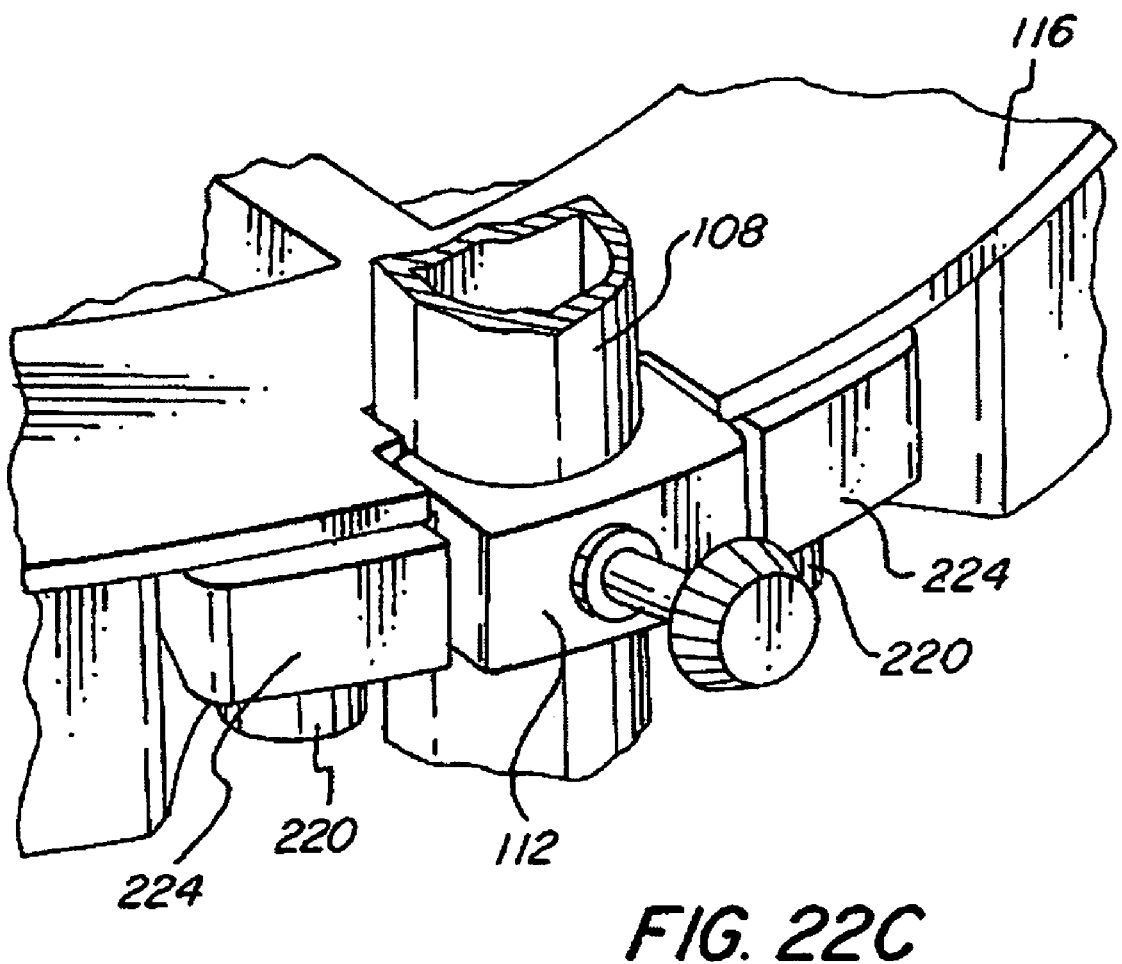
FIG. 22C is an illustration of the mounting of the tray attachment to the mounting element and bracket according to FIG. 22A.

Referring now to FIGS. 22A-22C, light fixture accessory 116 includes protrusions 220 that are provided to engage with recesses 222 provided on mounting element 224, as indicated by the downward arrows. In this particular embodiment, light fixture accessory 116 may simply be slid downward relative to mounting element 224. It is contemplated that protrusions 220 may be provided, but are not limited to, a generally cylindrical shape that engage with protrusions 220 that may also be generally round in cross-section. It is further contemplated that in another embodiment, protrusions 220 are provided with an increasing cross-sectional diameter such that with protrusions 220 are inserted into recesses 222, the protrusions 220 come into contact with the sides of the recesses to create a frictional fitting between protrusions 220 and recesses 222.

It is further contemplated that mounting element 224 may, in one advantageous embodiment, be integrally formed with stem 108 (FIGS. 22A & 22B), with protrusions 222 being positioned in mounting element 224 on opposing sides of stem 108.

Alternatively, mounting element 224 may, in another advantageous embodiment, be detachably connectable with stem 108 (FIG. 22C). In this particular embodiment, bracket 112 may engage with mounting element 224 as previously discussed in connection with FIGS. 20A and 20B. Mounting element 224 may be provided extending around a front of stem 108 while bracket 112 extends around a back side of stem 108 to securely clamp to stem 108. Light fixture accessory 116 may then be slid onto mounting element 224 as previously described in connection with FIGS. 22A and 22B.

Figure 23:
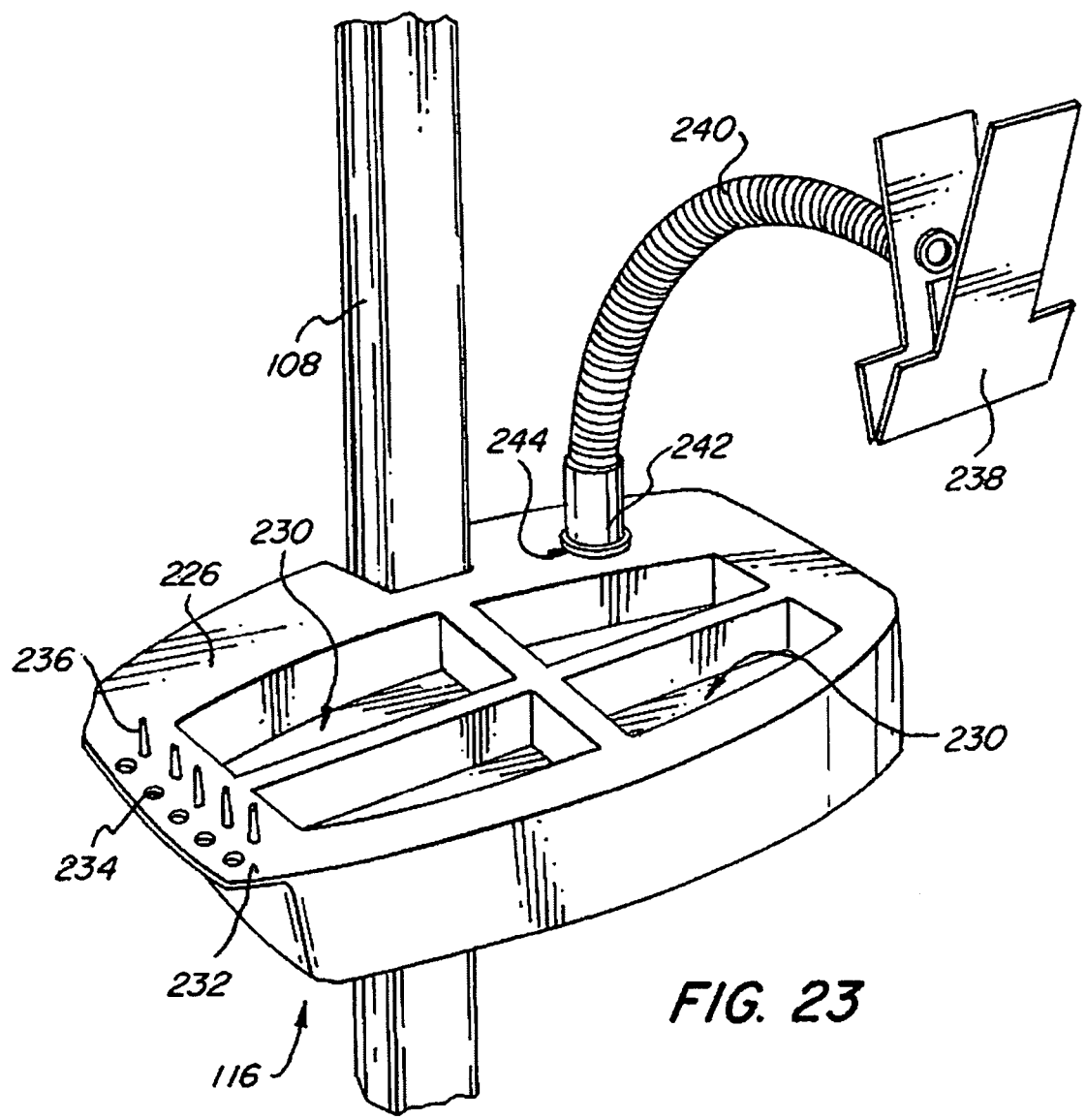
FIG. 23 is an illustration of one advantageous embodiment of the tray attachment.

Turning now to FIG. 23, the light fixture accessory 116 comprises a tray, which may be affixed or coupled to stem 108 by means of any of the previously described methods.

Tray 116 is provided with a plurality of compartments 230 positioned on an upper surface 226 of tray 116. While four compartments 230 are illustrated, it is contemplated that any number of compartments may be provided as desired. Also provided on tray 116 is flange 232, which is provided on one side of tray 116. Flange 232 is provided having a plurality (in this embodiment five) holes 234 provided extending through the flange 232. Also provided on the upper surface 226 are upstanding protrusions 236 positioned in proximity of holes 234.

Also shown on tray 116 is clip 238, which is coupled to tray 116 via flexible connector 240. Clip 238 may comprise a spring actuated clip that may be used to hold various items, such as, for example, papers, fabrics, patterns, etc. It is still further contemplated that flexible connector 240 may be detachably connected to tray 116 via, for example, a frictional fitting. In this manner, the end 242 of the flexible connector 240 may simply be inserted into an opening 244 provided in the upper surface 226 of tray 116.

It is contemplated that in one advantageous embodiment, tray 116 as well as mounting element 224, and (when used) bracket 112 may all comprise a durable, relatively lightweight molded plastic material.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A light fixture for housing a lamp comprising:
   a head for holding the lamp;
   a base;
   a stem extending from said head to said base;
   a bracket coupled to said stem, said bracket having at least one elongated recess provided therein;
   at least one light fixture accessory detachably connectable to said bracket;
   said at least one light fixture accessory having an elongated protrusion located thereon for linearly inserting into the elongated recess; and
   said at least one light fixture accessory being rigidly affixed at a point along said stem between said head and said base when the protrusion is inserted into the elongated recess.

2. The light fixture according to claim 1 wherein said bracket is integrally formed with said stem.

3. The light fixture according to claim 1 wherein said bracket has at least two recesses positioned on either side of said stem.

4. The light fixture according to claim 3 wherein said at least one light fixture accessory is has at least two protrusions for engaging with said at least two recesses.

5. The light fixture according to claim 1 wherein the protrusion is provided with an increasing diameter in cross-section such that when the protrusion is fitted into the recess, the protrusion is frictionally affixed to the recess.

6. The light fixture according to claim 1 wherein said at least one light fixture accessory is selected from the group consisting of: a tray attachment, a picture frame attachment, an article holder attachment, a utility basket attachment, a clock attachment, and combinations thereof.

7. The light fixture according to claim 6 wherein when said at least one light fixture accessory comprises a tray attachment, the tray attachment includes a plurality of compartments.

8. The light fixture according to claim 6 wherein when said at least one light fixture accessory comprises a tray attachment, the tray attachment includes a flange having at least one hole extending therethrough.

9. The light fixture according to claim 8 wherein said tray attachment further comprises at least one upstanding protrusion positioned adjacent to said hole.

10. The light fixture according to claim 1 wherein said light fixture comprises a desk lamp.

11. The light fixture according to claim 1 wherein said light fixture comprises a floor lamp.

12. The light fixture according to claim 1 further comprising a clip coupled to said at least one light fixture accessory via a flexible connector.

13. The light fixture according to claim 12 wherein said flexible connector is detachably connectable to said at least one light fixture accessory.

14. A light fixture for housing a lamp comprising:
    a head for holding the lamp;
    a base;
    a stem extending from said head to said base;
    a mounting element coupled to said stem;
    at least one light fixture accessory detachably connectable to said stem by means of said mounting element such that said at least one light fixture accessory may be selectively coupled to said stem;
    wherein said at least one light fixture accessory is selected from the group consisting of: a tray attachment, a picture frame attachment, an article holder attachment, a utility basket attachment, a clock attachment, and combinations thereof.

15. The light fixture according to claim 14 wherein said mounting element has at least one recess provided therein and said at least one light fixture accessory has a protrusion located thereon for engaging with the recess.

16. The light fixture according to claim 14 wherein said mounting element is integrally formed with said stem.

17. The light fixture according to claim 14 wherein said mounting element has at least two recesses positioned on either side of said stem.

18. The light fixture according to claim 17 wherein said at least one light fixture accessory is has at least two protrusions for engaging with said at least two recesses.

19. The light fixture according to claim 14 wherein when said at least one light fixture accessory comprises a tray attachment, the tray attachment includes a plurality of compartments.

20. The light fixture according to claim 14 wherein said light fixture comprises a desk lamp.

21. The light fixture according to claim 14 wherein said light fixture comprises a floor lamp.

22. A light fixture for housing a lamp comprising:
    a head for holding the lamp;
    a base;
    a stem extending from said head to said base;
    a mounting element connectable to said stem such that said mounting element may be positioned at a selected position along a length of said stem, said mounting element has at least two recesses positioned on either side of said stem; and
    at least one light fixture accessory detachably connectable to said stem by means of said mounting element, said at least one light fixture accessory is has at least two protrusions for engaging with said at least two recesses;
wherein said protrusions are inserted into and engage with said recesses to secure said accessory to said mounting element.

23. The light fixture according to claim 22 wherein said at least one light fixture accessory is selected from the group consisting of: a tray attachment, a picture frame attachment, an article holder attachment, a utility basket attachment, a clock attachment, and combinations thereof.

24. The light fixture according to claim 23 wherein when said at least one light fixture accessory comprises a tray attachment, the tray attachment includes a plurality of compartments.

* * * * *